(12) United States Patent
Evans

(10) Patent No.: US 7,010,794 B2
(45) Date of Patent: Mar. 7, 2006

(54) METHODS AND SYSTEMS FOR PREDICTING EVENTS ASSOCIATED WITH RENDERABLE MEDIA CONTENT SAMPLES

(75) Inventor: Glenn F. Evans, Kirkland, WA (US)

(73) Assignee: Microsoft Corporation, Redmond, WA (US)

(*) Notice: Subject to any disclaimer, the term of this patent is extended or adjusted under 35 U.S.C. 154(b) by 703 days.

(21) Appl. No.: 10/055,135

(22) Filed: Jan. 23, 2002

(65) Prior Publication Data

US 2003/0140178 A1    Jul. 24, 2003

(51) Int. Cl.
*G06F 9/46* (2006.01)
(52) U.S. Cl. ..................................... 719/318
(58) Field of Classification Search ................ 719/318
See application file for complete search history.

(56) References Cited

U.S. PATENT DOCUMENTS 5,768,523 A * 6/1998 Schmidt ..................... 709/224
6,088,018 A * 7/2000 DeLeeuw et al. ........... 345/156
6,665,378 B1 * 12/2003 Spielman et al. ........ 379/88.12

OTHER PUBLICATIONS

CG, Competer Graphics Workshop '97 Lecture Notes, Jan. 24, 1997.*

* cited by examiner

*Primary Examiner*—Meng-Al T. An
*Assistant Examiner*—LeChi Truong
(74) *Attorney, Agent, or Firm*—Lee & Hayes, PLLC

(57) ABSTRACT

Methods and systems are provided for predicting an event's occurrence and notifying one or more interested applications that an event has been predicted to have occurred. In various embodiments, the events are associated with media content samples that are to be rendered on a computing device. In one embodiment, multiple filters are provided and define a filter graph. The filter graph is configured to process multiple media content samples and includes one or more render filters that render the media content samples. An event prediction module, associated with the filter graph, receives event notification requests from an application and predicts rendition times associated with the individual events. Event notifications are sent to the application in accordance with the predictions that are made. The event prediction module can be located upstream of the render filters and, in some embodiments, can comprise part of one of the filters in the filter graph such as a source filter.

3 Claims, 6 Drawing Sheets

METHODS AND SYSTEMS FOR PREDICTING EVENTS ASSOCIATED WITH RENDERABLE MEDIA CONTENT SAMPLES

TECHNICAL FIELD

This invention relates generally to processing media content and, more particularly, to systems and methods for processing media content.

BACKGROUND

Recent advances in computing power and related technology have fostered the development of a new generation of powerful software applications. Gaming applications, communications applications, and multimedia applications have particularly benefited from increased processing power and clocking speeds. Indeed, once the province of dedicated, specialty workstations, many personal computing systems now have the capacity to receive, process and render multimedia objects (e.g., audio and video content). While the ability to display (receive, process and render) multimedia content has been around for a while, the ability for a standard computing system to support true multimedia editing applications is relatively new.

In an effort to satisfy this need, Microsoft Corporation introduced an innovative development system supporting advanced user-defined multimedia editing functions. An example of this architecture is described in U.S. Pat. No. 5,913,038, issued to Griffiths and commonly owned by the assignee of this document, the disclosure of which is expressly incorporated herein by reference.

In the '038 patent, Griffiths introduced an application program interface which, when exposed to higher-level development applications, enables a user to graphically construct a multimedia processing project by piecing together a collection of "filters" exposed by the interface. The interface described therein is referred to as a filter graph manager. The filter graph manager controls the data structure of the filter graph and the way that data moves through the filter graph. The filter graph manager provides a set of object model interfaces for communication between a filter graph and its application. Filters of a filter graph architecture implement one or more interfaces, each of which contains a predefined set of functions, called methods. Methods are called by an application program or other objects in order to communicate with the object exposing the interface. The application program can also call methods or interfaces exposed by the filter graph manager object.

Filter graphs work with data representing a variety of media (or non-media) data types, each type characterized by a data stream that is processed by the filter components comprising the filter graph. A filter positioned closer to the source of the data is referred to as an upstream filter, while those further down the processing chain is referred to as a downstream filter. For each data stream that the filter handles it exposes at least one virtual pin (i.e., distinguished from a physical pin such as one might find on an integrated circuit). A virtual pin can be implemented as an object that represents a point of connection for a unidirectional data stream on a filter. Input pins represent inputs and accept data into the filter, while output pins represent outputs and provide data to other filters. Each of the filters includes at least one memory buffer, and communication of the media stream between filters is often accomplished by a series of "copy" operations from one filter to another.

A filter graph can have a number of different types of filters, examples of which include source filters, transform filters, and render filters. A source filter is used to load data from some source, a transform filter processes and passes data, and a render filter renders data to a hardware device or other locations (e.g., to a file, etc.).

FIG. 1 shows an exemplary filter graph 100 for rendering media content. Filter graph 100 comprises a number of different filters 104–110 and may or may not comprise a source 102. A typical filter graph for multimedia content can include, for example, of graph portion that is dedicated to processing video content and a graph portion that is dedicated to processing audio content. For example, in FIG. 1 a source 102 provides content that is typically in compressed form. A source filter 104 receives the content and then provides the content to one or more decoder filters for decompression. In this example, consider that filters 106–110 process video content and filters 106a–110a process audio content. Accordingly, the decoder filters decompress the data and provide the data to a transform filter (e.g. filters 108, 108a) that operates on the data in some way. The transform filters then provide the transformed data to a corresponding render filter (e.g. 110, 110a) that then renders the data.

Typically, an application program or application 112 provides a means by which a user can interact with the content that is processed by the filter graph. Responsive to a user interacting with the application, the application can issue commands to the source filter 104. Examples of commands can include Run, Stop, Fast Forward, Rewind, Jump and the like. The source filter receives the commands and then takes steps to ensure that the commands are executed at the right time. For example, the source filter 104 typically receives data and provides timestamps onto data samples that define when the data sample is to be rendered by the render filters. The source filter then hands the timestamped data sample off to the decoder for further processing. The render filters now know, because of the timestamp, when the data sample is to be rendered.

It can be desirable, in situations such as this, for the application to be informed when a particular data sample has been rendered, or when an event associated with a particular data sample has actually occurred. This is because the application may have other tasks that need to be accomplished and which cannot be accomplished until certain events have occurred. Events can include the start of the stream, end of the stream, changes in the stream's content, specific points of interest and the like. Changes in the presentation rate, such as the playback speed or direction, can further complicate the situation.

Presently, the way that the application is notified when particular events occur is that the render filter 110 is notified that the application wishes to be informed when a particular event occurs. The render filter waits until the particular event actually occurs (e.g. a data sample is rendered), and then sends a notification to its upstream filter—in this case the transform filter 108. The transform filter 108, in turn, sends the notification to the decoder filter 106 which then relays the notification to the source filter 104 and then onto the application.

Relying on the render filters to notify the application increases the design complexity of the output components and their workload responsibilities. Additional problems with this approach include that if the application requests a notification when a particular event has transpired, then the request itself must be either sent as a separate piece of data along with details indicating when the message should be sent, or the request must be attached to the data to be displayed. Additionally, a delay accumulates as the request propagates down the filter graph and as the notification returns from the filter. The delay can also be affected by process scheduling or network conditions and is beyond the control of the application.

Another approach to notifying the application when a particular event has transpired can be to establish a direct connection between the application and the render filters. This, however, is undesirable because it necessarily binds the render filter to the application and makes re-using the render filter for different applications impossible since each filter must have complete knowledge of the other. Different render filters cannot then be used with the same application.

Products utilizing the filter graph have been well received in the market as it has opened the door to multimedia editing using otherwise standard computing systems. It is to be appreciated, however, that the construction and implementation of the filter graphs are computationally intensive and expensive in terms of memory usage. Even the most simple of filter graphs requires and abundance of memory to facilitate the copy operations required to move data between filters. Complex filter graphs can become unwieldy, due in part to the linear nature of filter graph architecture. Moreover, it is to be appreciated that the filter graphs themselves consume memory resources, thereby compounding the issue introduced above.

Accordingly, this invention arose out of concerns associated with providing improved methods and systems for processing media content. In particular, the invention arose out of concerns associated with providing improved filter graph systems and methods.

SUMMARY

Methods and systems are provided for predicting an event's occurrence and notifying one or more interested applications that an event has been predicted to have occurred. In various embodiments, the events are associated with media content samples that are to be rendered on a computing device.

In one embodiment, multiple filters are provided and define a filter graph. The filter graph is configured to process multiple media content samples and includes one or more render filters that render the media content samples. An event prediction module, associated with the filter graph, receives event notification requests from an application and predicts rendition times associated with the individual events. Event notifications are sent to the application in accordance with the predictions that are made. The event prediction module can be located upstream of the render filters and, in some embodiments, can comprise part of one of the filters in the filter graph such as a source filter.

DETAILED DESCRIPTION

Overview

Methods and systems are provided for predicting an event's occurrence and notifying one or more interested applications that an event has been predicted to have occurred. In various embodiments, the events are associated with media content samples that are to be rendered on a computing device.

In one embodiment, multiple filters are provided and define a filter graph. The filter graph is configured to process multiple media content samples and includes one or more render filters that render the media content samples. An event prediction module, associated with the filter graph, receives event notification requests from an application and predicts rendition times associated with the individual events. Event notifications are sent to the application in accordance with the predictions that are made. The event prediction module can be located upstream of the render filters and, in some embodiments, can comprise part of one of the filters in the filter graph such as a source filter.

The various inventive embodiments described herein can effectively eliminate problems associated with back-propagating event notifications through a filter graph to a requesting application. Thus, problems associated with lags that can be inherent in back-propagating systems can be greatly mitigated. In addition, the inventive embodiments can enhance the flexibility of filter graphs with which they are employed because render filters are not bound to event-requesting applications.

Exemplary Computing Environment

Figure 2:
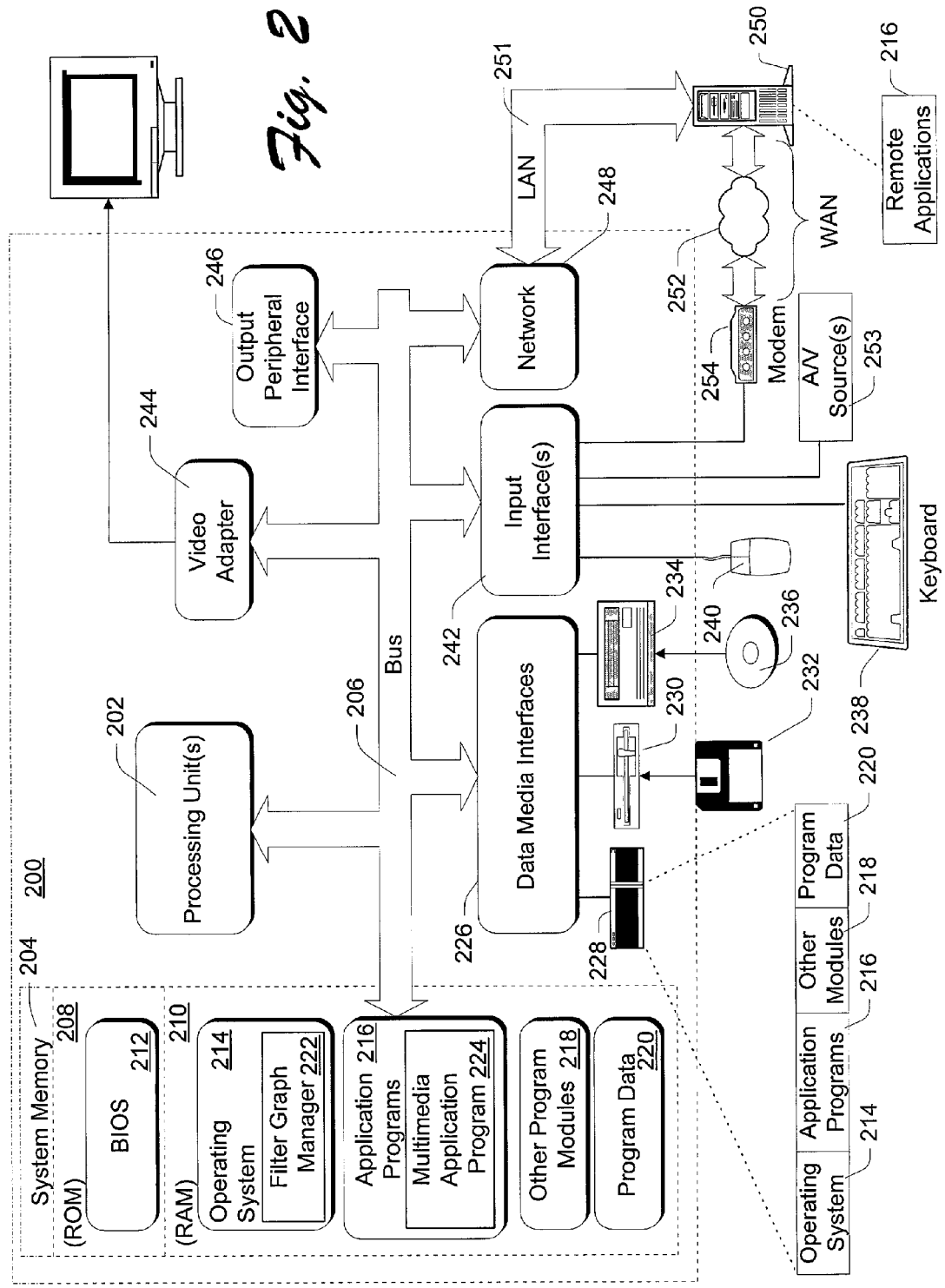
FIG. 2 is a block diagram that illustrates an exemplary computer system that can be used to implement various embodiments described below.

FIG. 2 illustrates an example of a suitable computing environment 200 on which the system and related methods for processing media content may be implemented.

It is to be appreciated that computing environment 200 is only one example of a suitable computing environment and is not intended to suggest any limitation as to the scope of use or functionality of the media processing system. Neither should the computing environment 200 be interpreted as having any dependency or requirement relating to any one or combination of components illustrated in the exemplary computing environment 200.

The media processing system is operational with numerous other general purpose or special purpose computing system environments or configurations. Examples of well known computing systems, environments, and/or configurations that may be suitable for use with the media processing system include, but are not limited to, personal computers, server computers, thin clients, thick clients, hand-held or laptop devices, multiprocessor systems, microprocessor-based systems, set top boxes, programmable consumer electronics, network PCs, minicomputers, mainframe computers, distributed computing environments that include any of the above systems or devices, and the like.

In certain implementations, the system and related methods for processing media content may well be described in the general context of computer-executable instructions, such as program modules, being executed by a computer. Generally, program modules include routines, programs, objects, components, data structures, etc. that perform particular tasks or implement particular abstract data types. The media processing system may also be practiced in distributed computing environments where tasks are performed by remote processing devices that are linked through a communications network. In a distributed computing environment, program modules may be located in both local and remote computer storage media including memory storage devices.

In accordance with the illustrated example embodiment of FIG. 2 computing system 200 is shown comprising one or more processors or processing units 202, a system memory 204, and a bus 206 that couples various system components including the system memory 204 to the processor 202.

Bus 206 is intended to represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus also known as Mezzanine bus.

Computer 200 typically includes a variety of computer readable media. Such media may be any available media that is locally and/or remotely accessible by computer 200, and it includes both volatile and non-volatile media, removable and non-removable media.

In FIG. 2, the system memory 204 includes computer readable media in the form of volatile, such as random access memory (RAM) 210, and/or non-volatile memory, such as read only memory (ROM) 208. A basic input/output system (BIOS) 212, containing the basic routines that help to transfer information between elements within computer 200, such as during start-up, is stored in ROM 208. RAM 210 typically contains data and/or program modules that are immediately accessible to and/or presently be operated on by processing unit(s) 202.

Computer 200 may further include other removable/non-removable, volatile/non-volatile computer storage media. By way of example only, FIG. 2 illustrates a hard disk drive 228 for reading from and writing to a non-removable, non-volatile magnetic media (not shown and typically called a "hard drive"), a magnetic disk drive 230 for reading from and writing to a removable, non-volatile magnetic disk 232 (e.g., a "floppy disk"), and an optical disk drive 234 for reading from or writing to a removable, non-volatile optical disk 236 such as a CD-ROM, DVD-ROM or other optical media. The hard disk drive 228, magnetic disk drive 230, and optical disk drive 234 are each connected to bus 206 by one or more interfaces 226.

The drives and their associated computer-readable media provide nonvolatile storage of computer readable instructions, data structures, program modules, and other data for computer 200. Although the exemplary environment described herein employs a hard disk 228, a removable magnetic disk 232 and a removable optical disk 236, it should be appreciated by those skilled in the art that other types of computer readable media which can store data that is accessible by a computer, such as magnetic cassettes, flash memory cards, digital video disks, random access memories (RAMs), read only memories (ROM), and the like, may also be used in the exemplary operating environment.

A number of program modules may be stored on the hard disk 228, magnetic disk 232, optical disk 236, ROM 208, or RAM 210, including, by way of example, and not limitation, an operating system 214, one or more application programs 216 (e.g., multimedia application program 224), other program modules 218, and program data 220. In accordance with the illustrated example embodiment of FIG. 2, operating system 214 includes an application program interface embodied as a render engine 222. As will be developed more fully below, render engine 222 is exposed to higher-level applications (e.g., 216) to automatically assemble filter graphs in support of user-defined development projects, e.g., media processing projects. Unlike conventional media processing systems, however, render engine 222 utilizes a scalable, dynamically reconfigurable matrix switch to reduce filter graph complexity, thereby reducing the computational and memory resources required to complete a development project. Various aspects of the innovative media processing system represented by a computer 200 implementing the innovative render engine 222 will be developed further, below.

Continuing with FIG. 2, a user may enter commands and information into computer 200 through input devices such as keyboard 238 and pointing device 240 (such as a "mouse"). Other input devices may include a audio/video input device(s) 253, a microphone, joystick, game pad, satellite dish, serial port, scanner, or the like (not shown). These and other input devices are connected to the processing unit(s) 202 through input interface(s) 242 that is coupled to bus 206, but may be connected by other interface and bus structures, such as a parallel port, game port, or a universal serial bus (USB).

A monitor 256 or other type of display device is also connected to bus 206 via an interface, such as a video adapter 244. In addition to the monitor, personal computers typically include other peripheral output devices (not shown), such as speakers and printers, which may be connected through output peripheral interface 246.

Computer 200 may operate in a networked environment using logical connections to one or more remote computers, such as a remote computer 250. Remote computer 250 may include many or all of the elements and features described herein relative to computer 200 including, for example, render engine 222 and one or more development applications 216 utilizing the resources of render engine 222.

As shown in FIG. 2. computing system 200 is communicatively coupled to remote devices (e.g., remote computer 250) through a local area network (LAN) 251 and a general wide area network (WAN) 252. Such networking environments are commonplace in offices, enterprise-wide computer networks, intranets, and the Internet.

When used in a LAN networking environment, the computer 200 is connected to LAN 251 through a suitable network interface or adapter 248. When used in a WAN networking environment, the computer 200 typically includes a modem 254 or other means for establishing communications over the WAN 252. The modem 254, which may be internal or external, may be connected to the system bus 206 via the user input interface 242, or other appropriate mechanism.

In a networked environment, program modules depicted relative to the personal computer 200, or portions thereof, may be stored in a remote memory storage device. By way of example, and not limitation, FIG. 2 illustrates remote application programs 216 as residing on a memory device of remote computer 250. It will be appreciated that the network connections shown and described are exemplary and other means of establishing a communications link between the computers may be used.

Exemplary Event Prediction Module

Figure 3:
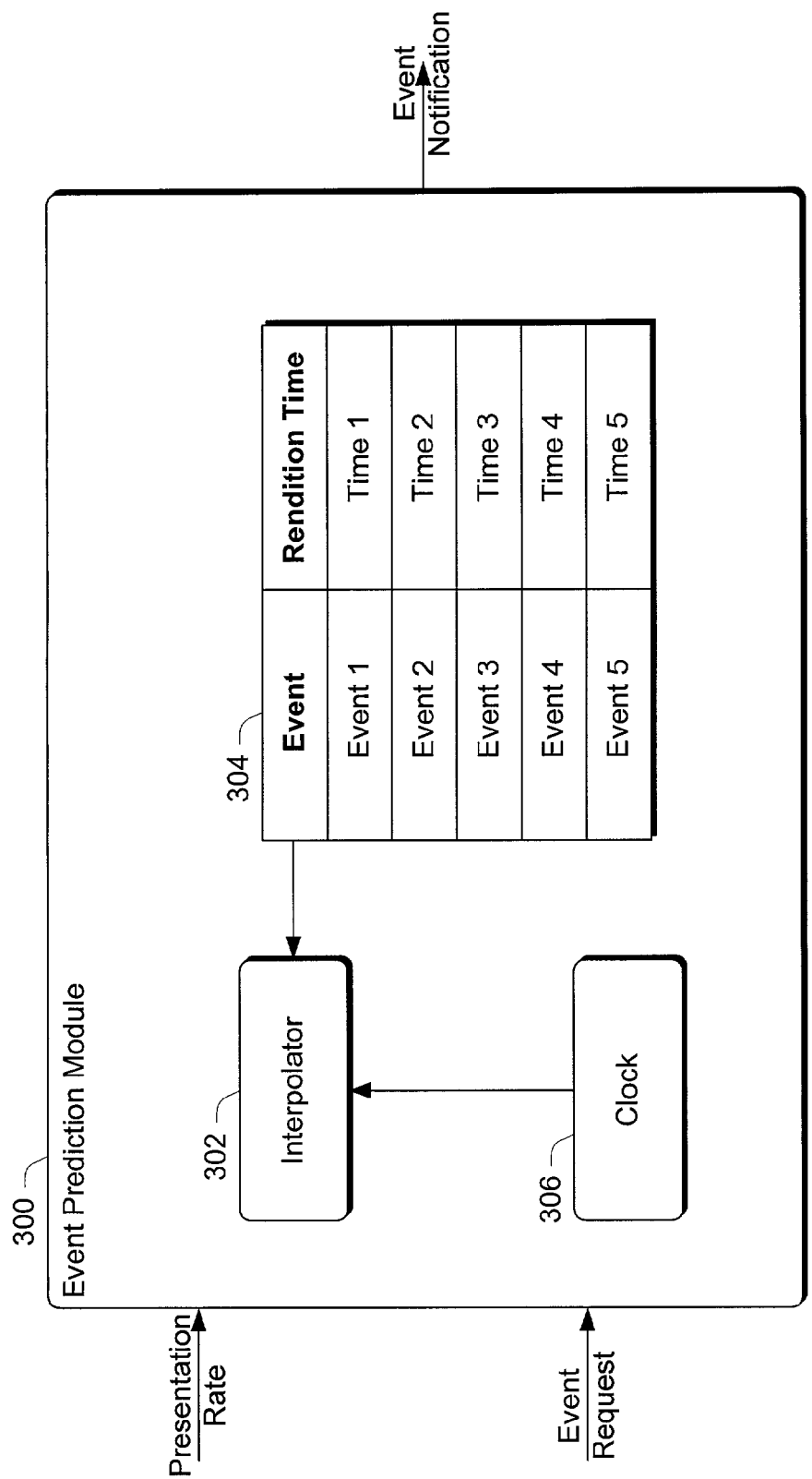
FIG. 3 is a block diagram of an exemplary event prediction module in accordance with one embodiment.

FIG. 3 shows an exemplary event prediction module 300 in accordance with one embodiment. The illustrated module can be implemented in any suitable hardware, software, firmware or combination thereof. In the illustrated example, the module is implemented in software.

In the illustrated and described embodiment, event prediction module 300 includes an interpolator 302, an event list 304 and a clock 306. Although these components are shown together within the confines of the event prediction module 300, it is to be appreciated and understood that the individual components of module 300 need not reside within the module itself. For example, clock 306 can simply comprise notifications that are sent to the event prediction module to provide a current clock value.

The event prediction module 300 receives event notification requests and maintains each requested event in the event list 304. Along with the event requests, the rendition time (or occurrence time) of each of the events is stored in the event list. The event requests can be received from an application that requests a notification when a particular event has occurred. The event prediction module 300 can also receive a presentation rate which is the rate at which data samples are being presented or rendered. As this rate can change, the event prediction module 300 can receive updates on the presentation rate as it changes. Alternately, the event prediction module can calculate the presentation rate.

Clock 306 provides a measure of the time and can correspond to the time that various data samples are presently being rendered. Interpolator 302 is configured to compute an event's actual rendition time and then cause the event prediction module 300 to generate an event notification that can be sent to the application to notify that an event has occurred. Notice here that the interpolator computes or predicts that an event has occurred without actual notice that an event has, in fact, occurred. Thus, event notifications can be sent to the application in a timely manner. This can advantageously avoid any lag in notification due to the event notification having to be back propagated through the filter graph. Accordingly, the render filter need not be concerned with generating any event notifications. In addition, intervening filters need not be concerned with receiving and forwarding event notifications. Further, since the render filter is not bound to the application, the render filter can be flexibly employed with other applications.

Consider for example event list 304. There, five different events have been listed with their corresponding rendition time. The interpolator 302 knows the current time based on clock 306. The interpolator also knows the presentation rate. Based on these two pieces of information, the interpolator can calculate when an event notification should be sent for each of the events in the event list.

Figure 1:
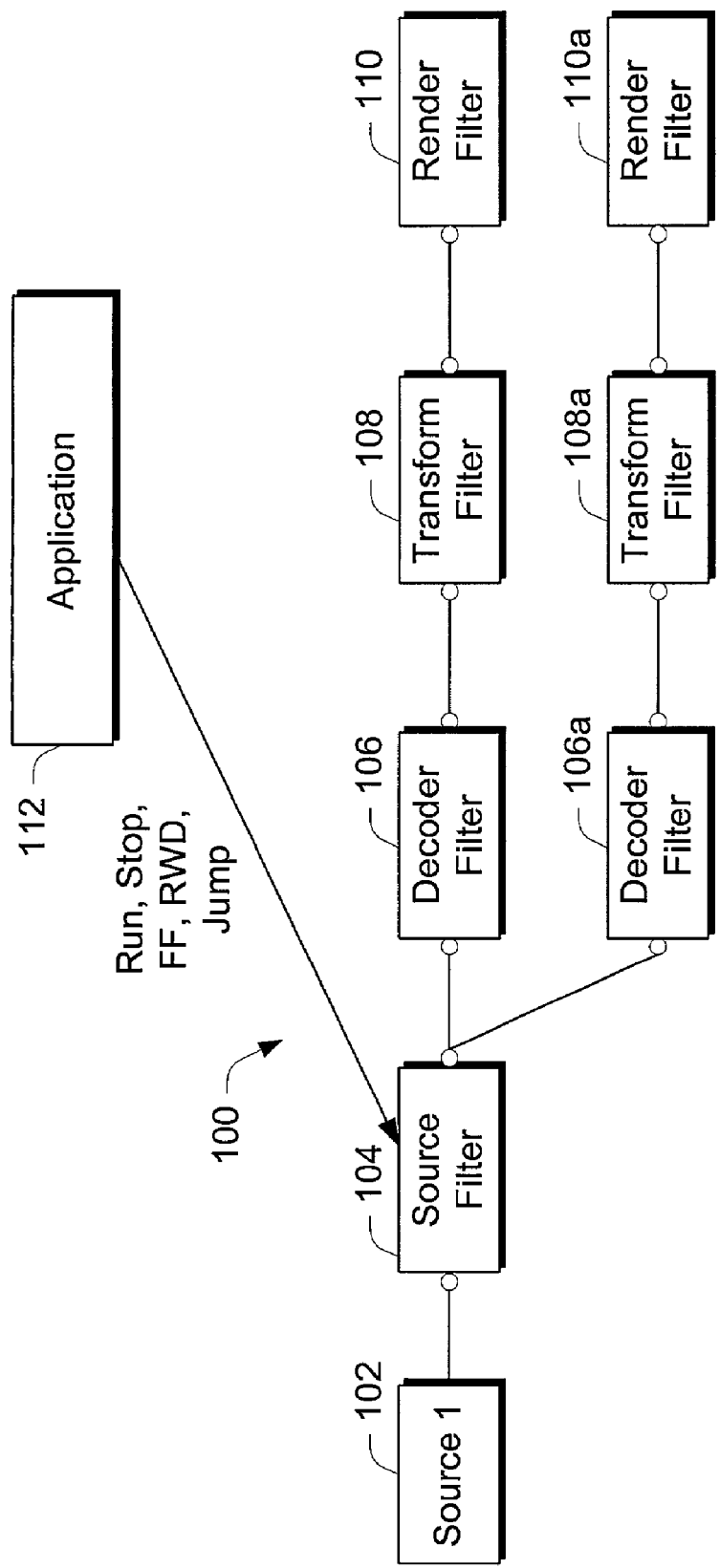
FIG. 1 is a diagram of an exemplary conventional filter graph.
Figure 4:
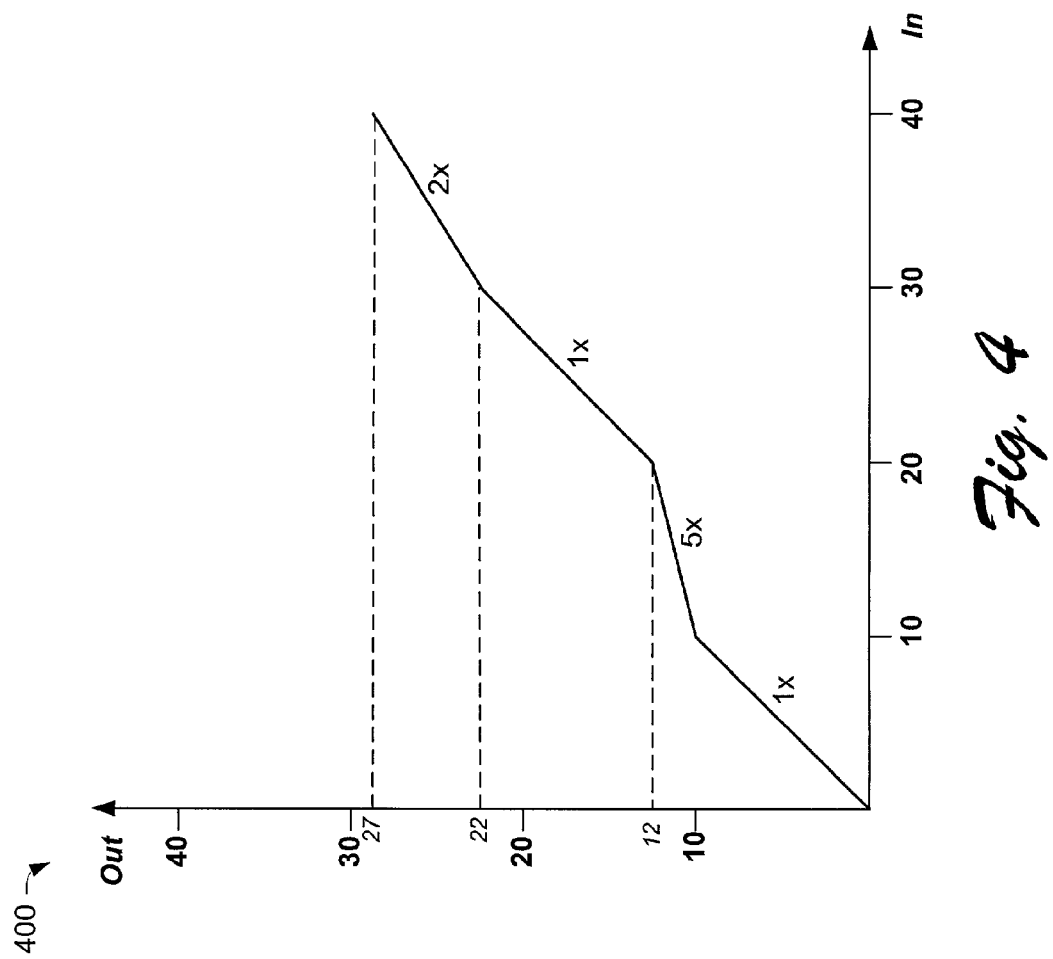
FIG. 4 is a graph that is useful in understanding various concepts associated with the described embodiments.

As a more tangible example, consider FIG. 4. There, a graph 400 is provided. The x-axis is designated "In" and represents the input timestamp of a particular data sample. The y-axis is designated "Out" and represents the output timestamp of a particular data sample. When a data sample is received for rendering, the source filter (such as source filter 104 in FIG. 1) provides the data sample with a timestamp that indicates when the data sample is to be rendered. The source filter then provides the data sample to the decoder filter (such as decoder filter 106). Now assume that the user, through the application, indicates that the following should occur:

For the data samples with input timestamps of 1–10, they wish to have the samples rendered at a normal 1—1 play rate;

For the data samples with the input timestamps of 11–20, they wish to have the samples rendered at 5 times the normal rate (i.e. fast forwarded at 5x);

For the data samples with input timestamps of 21–30, they wish to have the samples rendered at a normal 1—1 play rate;

For the data samples with input timestamps of 31–40, they wish to have the samples rendered at 2 times the normal rate (i.e. fast forwarded at 2x).

Assume also that the application has generated an event request for each of the four above events because, for example, the application may have to perform some associated tasks when each event concludes. Specifically, the application has requested that it be notified at the conclusion of each of the events. As part of the process that takes place, the decoder filter can adjust the timestamps for the relevant samples so that the samples' output timestamps now comport with the events (or commands such as "play", "fast forward at 2x" and "fast forward at 5x") that the application has provided. For example, in order to render the data samples that originally had timestamps of 11–20 (10 timestamps in total) at 5 times the play rate, those samples will need to be rendered as if they had timestamps of 11 and 12 (i.e. 2 timestamps in total).

So, with this in mind, consider again FIG. 4. For input timestamps of 1–10 there is a one-to-one correspondence between input and output timestamps, meaning that the data samples will be rendered at a normal play rate. Input timestamps of 11–20 will be mapped to output timestamps of 11 and 12 because of the 5x fast forward play rate. Input timestamps of 21–30 will be mapped to output timestamps of 13–22 because of the one-to-one normal play rate. And, input timestamps of 31–40 will be mapped to output timestamps of 23–27 because of the 2x fast forward play rate.

Now, recall that the event prediction module 300 knows the presentation rate associated with each of the data samples as well as the current time. Accordingly, interpolator 302 can calculate the rendition time of each of the events and make entries in its event list as follows:

| Event | Rendition Time |
|---|---|
| Notify application at conclusion of first 1x play | 10 |
| Notify application at conclusion of first 5x play | 12 |
| Notify application at conclusion of second 1x play | 22 |
| Notify application at conclusion of first 2x play | 27 |

Now, when the clock 306 indicates that the time is at a value of 10, the event prediction module 300 generates and sends an event notification to the application. Similarly, when the clock indicates that the time is at a value of 12, the event prediction module generates and sends an event notification to the application notifying the application that the first 5x play has concluded and so on. Accordingly, the application is notified in a timely manner that a particular event has occurred. It should be noted that the event prediction module assumes that the render filter is going to perform its job at the allotted time.

Thus, in this example, the event prediction module can generate and send event notifications to the application independent of the render filter. This means that the event prediction module need not have any knowledge of the render filter. As a result, very minimal delays (if any) are incurred between an event transpiring and an application's notification that an event has transpired.

The event prediction module can be located at any suitable location where it can generate event notifications. For example, in some instances, so-called "smart applications" can embody an event prediction module so that the application receives notifications at the appropriate time. In other instances, the event prediction module can be located within the filter graph, upstream of the render filter.

Figure 5:
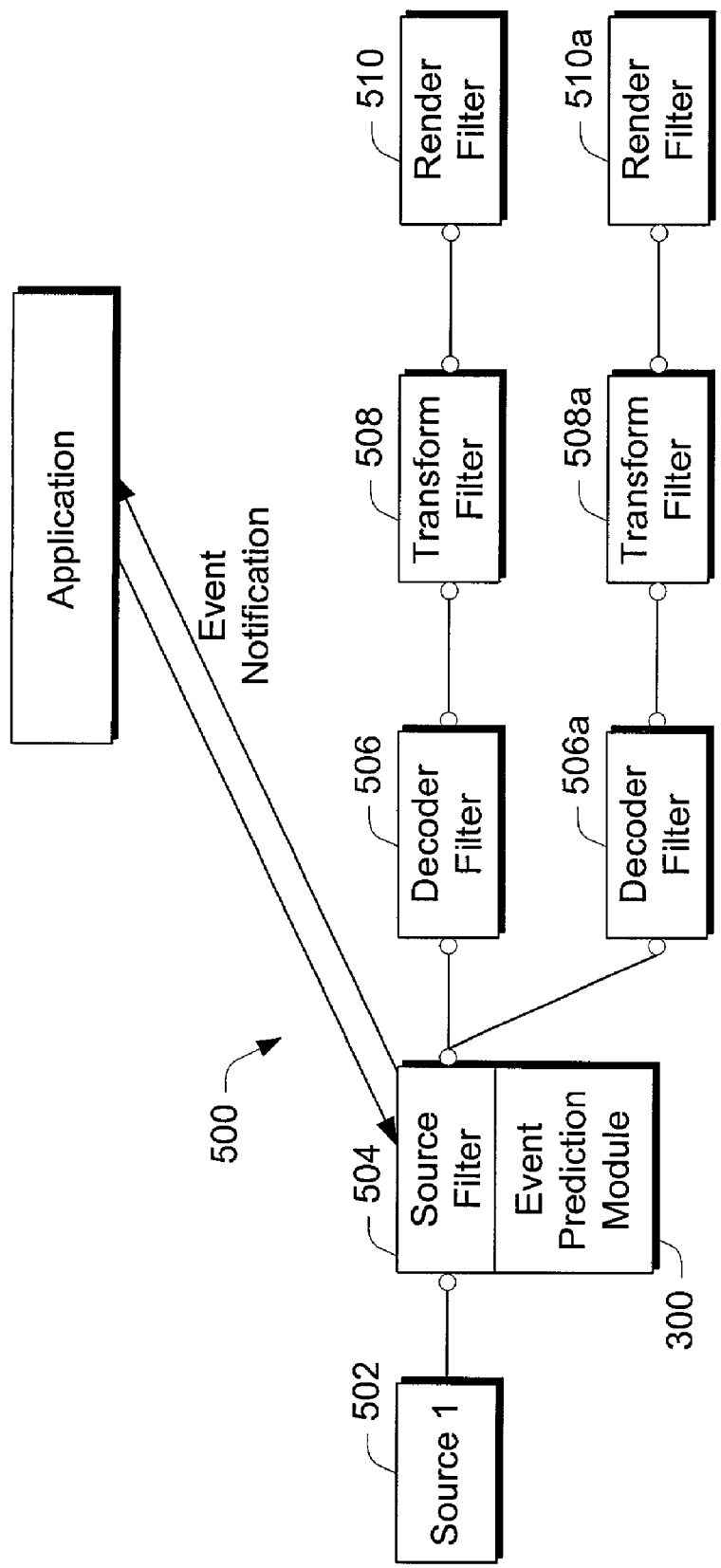
FIG. 5 is a diagram of an exemplary filter graph in accordance with one embodiment.

FIG. 5 shows one example where the event prediction module is located within and comprises part of the source filter. Specifically, a filter graph 500 includes a source 502 that provides a source of data samples that are to be rendered. Source filter 504 receives the data samples and passes the data samples along to the various components of the filter graph (i.e. decoder filters 506, 506a, transform filters 508, 508a, and render filters 510, 510a). In addition, source filter 504 includes an event prediction module 300. As the application communicates various commands (such as fast forward) to the source filter, the source filter processes the commands and forwards the commands to the decoder filters. Recall that the decoder filters can process the various timestamps of the data samples (e.g. by mapping the input timestamps to output timestamps as described above) to ensure that the samples are rendered by the render filters at the appropriate time. In addition to performing these tasks, the source filter or, more appropriately, the source filter's event prediction module 300, receives the event requests that can accompany the commands as well as additional data, such as the presentation rate associated with the data samples, and can build its event list. It does so by predicting or linearly interpolating the rendition times of the events so that at the appropriate time, it can notify the application that a particular event has transpired.

As an example of the processing that can take place in the event prediction module, consider the following: If the event E is contained in the presentation time interval $(P_i, P_{i+1})$ and the presentation rate $R_i$ of the interval is available, then the source filter (or event prediction module) can compute the actual rendition time T of the event given the initial rendering time $P_0$ by linearly interpolating:

$$T = \left[\sum_{j=1}^{i-1} \frac{P_{j+1} - P_j}{R_j}\right] + \frac{E - P_i}{R_i} - P_0$$

Thus, if the presentation rate $R_I$ is 1.0 for all intervals, then the rendition time T is equal to the event's presentation time E less the initial rendering time $P_0$:

$T = E - P_0$

Exemplary Method

Figure 6:
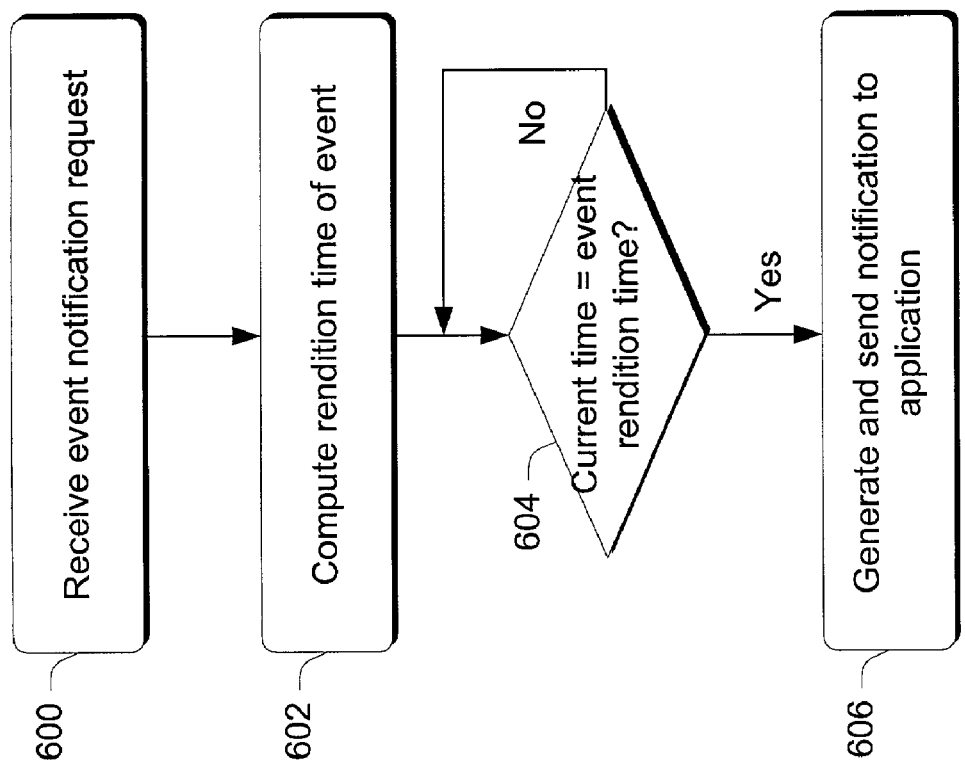
FIG. 6 is a flow diagram that describes steps in a method in accordance with one embodiment.

FIG. 6 is a flow diagram that describes steps in a method in accordance with one embodiment. The method can be implemented in any suitable hardware, software, firmware or combination thereof. In the present example, the method is implemented in software. Advantageously, the method can be implemented, at least in part, by a suitably programmed event prediction module. Examples of event prediction modules are described above.

Step 600 receives an event notification request. The event notification request is typically generated by the application and sent to the source filter. In the past, this request was sent down the filter graph to the render filter so that the render filter could watch for events, and then send a notification back up through the filter graph to the application. In the present example, this request is not sent down to the render filter and, in fact, is received upstream of the render filter. The request can be received by an event prediction module such as the one described in connection with FIG. 3. This event prediction module can reside at any suitable location such as those that are upstream of the render filters. For example, the event prediction module can be located between the application and the filter graph, can comprise part of the application, can comprise part of the source filter or any other suitable filters upstream of the render filter.

Step 602 computes a rendition time of the event associated with the event notification request. For example, typically commands from the application are sent to the source filter. These commands typically contain a presentation time or time interval in which a particular event is to occur. Additionally, these commands can include the presentation rate at which presentation is to occur (e.g. render samples 1–10 at 5 times the playback speed). The event prediction module can process the presentation time or time interval of a particular event, along with the appropriate presentation rates and compute or estimate the rendition time of the event. One example of how this can be done is given in FIG. 4.

Step 604 determines whether the current time is equal to an event rendition time. For example, as noted in FIG. 3, the event prediction module includes a clock 306 that can indicate the current time. The event prediction module then determines whether the current time is equal to any of the rendition times stored in its event list. If so, then step 606 generates and sends a notification to the application. If not, then this step can loop back to continue to check the current time against the computed rendition times.

Conclusion

The described methods and systems provide a general solution that can be applied to many multimedia streaming and network scheduling applications. The inventive methods and systems can remove requirements of output filters having to notify various applications concerning events that transpire during rendering of media samples. This, in turn, is advantageous in that it simplifies filter designs. This also increases the robustness and accuracy of the events by eliminating the need for notifications to propagate back from the output filters.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A system comprising:

processor;

an event prediction module operably associated with multiple media content samples that are to be rendered for a user, wherein the event prediction module comprises an event list that stores information associated with events and associated event rendition times, and the event prediction module being configured to:

receive event notification requests from an application pertaining to events associated with the media content samples;

predict the rendition times associated with the individual events by taking into account one or more presentation rates that define a rate at which individual media content samples are to be rendered;

generate event notifications in accordance with their predicted rendition times by performing linear interpolation; and send the event notifications to an application.

2. A computer-implemented method comprising:

receiving an event notification request from an application, the event notification request requesting a notification pertaining to events associated with one or more media content samples that are to be rendered;

storing information associated with events and associated event rendition times in an event list;

predicting rendition times associated with the individual events, wherein the act of predicting is accomplished, at least in part, by taking into account one or more presentation rates at which individual content samples are to be rendered and by performing at least one linear interpolation; and sending at least one event notification to the application responsive to an associated event having been predicted to occur at a particular rendition time.

3. One or more computer-readable media having computer-readable instructions thereon which, when executed by one or more processors, cause the one or more processors to:

receive an event notification request from an application, the event notification request requesting a notification pertaining to events associated with one or more media content samples that are to be rendered;

store information associated with events and associated event rendition times in an event list;

predict rendition times associated with the individual events, wherein prediction of rendition times is accomplished, at least in part, by taking into account one or more presentation rates at which individual content samples are to be rendered and by performing at least one linear interpolation; and send at least one event notification to the application responsive to an associated event having been predicted to occur at a particular rendition time.

* * * * *

UNITED STATES PATENT AND TRADEMARK OFFICE
CERTIFICATE OF CORRECTION

PATENT NO. : 7,010,794 B2
APPLICATION NO. : 10/055135
DATED : March 7, 2006
INVENTOR(S) : Glenn F. Evans Page 1 of 1

It is certified that error appears in the above-identified patent and that said Letters Patent is hereby corrected as shown below:

On the face page, in field (56), under "Other Publications", delete "Competer" and insert -- Computer --, therefor.

In column 9, line 41, delete " $i - 1$ " and insert -- $i-1$ --, therefor.

In column 9, line 41, delete " $\dfrac{E - P_i}{R_i}$ " and insert -- $\dfrac{E - P_t}{R_t}$ --, therefor.

Signed and Sealed this

Thirtieth Day of March, 2010

David J. Kappos
*Director of the United States Patent and Trademark Office*